March 2, 1954   B. H. HADLEY   2,670,511
METHOD OF LINING BEARINGS
Filed April 20, 1953
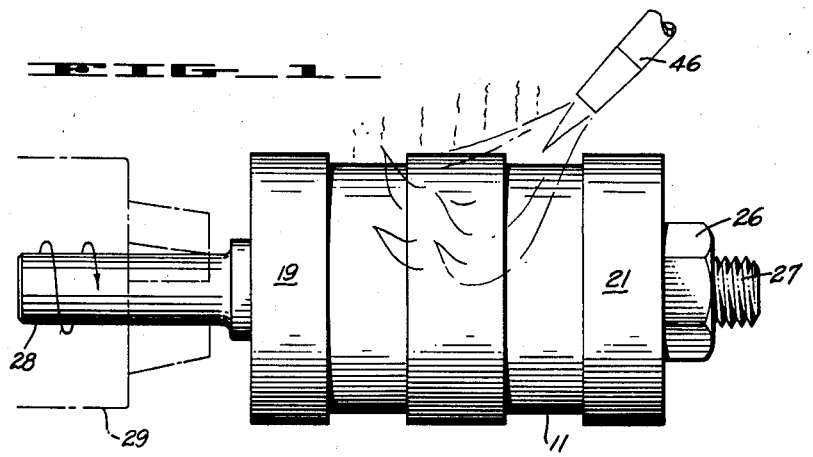
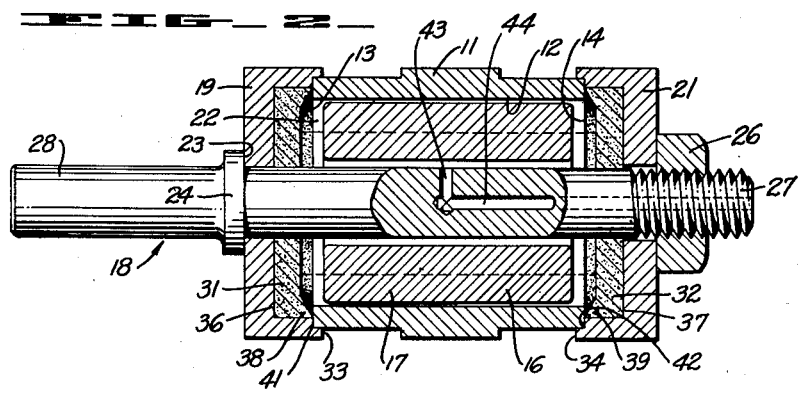
Inventor
BENJAMIN H. HADLEY,
By Manfred M. Warren
Attorney Patented Mar. 2, 1954

2,670,511

UNITED STATES PATENT OFFICE 2,670,511

METHOD OF LINING BEARINGS

Benjamin H. Hadley, Pomona, Calif.

Application April 20, 1953, Serial No. 349,919

2 Claims. (Cl. 22—200.5)

The invention relates to the manufacture of sleeve-type bearings, and more particularly to methods for lining bearing retainer members with a layer of babbitt, lead alloy, or other anti-friction bearing metal. This application is a continuation-in-part of my application Serial No. 181,297, filed August 24, 1950, for Method and Apparatus for Lining Bearings.

An object of the present invention is to provide an improved method for applying and bonding a uniform layer of bearing metal to an internal cylindrical surface of a bearing retainer member which will afford an extremely fast and precise moulding of the lining in place and an improved bonding and compacting of a clean, homogeneous layer of bearing material on the retainer surface, and the substantially complete elimination, from a practical standpoint, of the formation of slag or weakening oxides which customarily impair the bond between the bearing metal and the retainer surface and prevent the formation of a perfectly clean and homogeneous layer of bearing material.

Another object of the present invention is to provide a method of the character described in which any impurities, oxides or gas bubbles present in the molten bearing metal will be automatically displaced to out-of-the-way positions and which may later be removed to provide a uniform and impurity-free lining.

A further object of the present invention is the provision of a method of the character above in which the molten metal is positively prevented from bonding to anything but the retainer surfaces to be lined whereby removal of the retainer may be effected without interfering with, impairing or without destroying the bond between the bearing metal and the retainer.

The invention possesses other objects and features of advantage, some of which, with the foregoing, will be set forth in the following description of the preferred form of the invention which is illustrated in the drawing accompanying and forming part of the specification. It is understood, however, that variations in the showing made by said drawing and description may be adopted within the scope of the invention as set forth in the claims.

Referring to said drawing:

Figure 1 is a side elevational view of an apparatus used in performing the process of the present invention and illustrates one stage of such process.

Figure 2 is a longitudinal sectional view of the apparatus illustrated in Figure 1.

Figure 3 is a perspective view of a bearing metal billet used with the apparatus of Figure 1 in performing the present process.

The process of the present invention pertains to the forming of a bearing lining or sleeve on the internal cylindrical surface of a bearing retainer member to provide an appropriate metal surface for journalling, supporting, and/or sealing of a relatively rotatable shaft part. Heretofore such linings have been formed by pouring molten bearing metal into a stationary mould or by spinning the retainer member and mold to provide a centrifugal distribution of the molten bearing metal over the surface to be lined. The relative disadvantages of former methods used include slowness of forming the bearing, required use of awkward and cumbersome devices, exposure of workmen to burns, spattering of hot metal, etc., and the formation in the molten metal of slag and oxides which impair the bond of the retainer member and become admixed in the body of the bearing layer. Attempts have been made to prevent formation of such oxides by passing inert gases through the mold or by using a volatile flux in the mold to exclude the air from the molten metal. The present invention is for a process in which the formation of oxides at the bonding surface is prevented without the use of unwieldy or dangerous equipment and procedures as may be required by the above described methods.

In accordance with the present invention and as a principal feature thereof, a preformed tubular billet of bearing material roughly corresponding to the shape of the lining to be placed is inserted within the hollow interior of the bearing retainer member, with the exterior surface of the billet in juxtaposition with the interior surface of the bearing retainer member, the interior of the bearing member closed off to define a substantially closed chamber, and the assembly spun at a relatively high speed around the axis of the surface to be bonded while being heated, whereby a softening and substantially instantaneous centrifugal slumping of the molten bearing material onto the retainer surface is effected just prior to the complete melting of the bearing material. Additionally, and in accordance with the present invention, a metallic core member is provided centrally through the tubular billet for reducing the air space within the chamber and for radiating heat to the internal peripheral surface of the billet. In this manner, there is initially present a minimum amount of atmosphere between the exterior of the billet and the interior surface to be bonded, and within the interior of the billet. The initial softening and displacement of the exterior periphery of the billet completely and effectively displaces the atmosphere between such metal and the surface 12, thereby practically eliminating the formation of slag or oxides which will interfere with the bonding of the bearing metal to the surface of the retainer member. Thereafter the further melting of the billet is effected in an atmosphereless environment which precludes the formation of such oxides, etc., thereby insuring the deposit of clean, homogeneous metal in the building up of the bearing lining. I have found that bearings produced by the process of the present invention show marked increases in wear resistance, uniformity, toughness and durability under load conditions. Considered of importance in obtaining these beneficial results is the practically instantaneous displacement of bearing metal when heated to its melting point onto the retainer surface and the high speed centrifugal movement of such molten material through an exceedingly short space and in the substantially complete absence of oxidizing atmosphere.

The process of the present invention will be more fully understood with reference to the accompanying drawing wherein is illustrated a bearing retainer member 11 of the general type with which the process is adapted to be used. This member may have any desired exterior shape and may be characterized for present purposes by its provision of an internal cylindrical bearing retaining surface 12 which extends for substantially the full length of the member between the opposite ends 13 and 14 thereof. This retainer member is customarily formed of iron or steel and a lining 16 generally denoted by a dash line on the drawing of bearing material is bonded to the surface 12 so as to provide an appropriate metal surface for journalling, supporting and/or sealing of a relatively rotatable shaft part not shown. Usually the bearing lining is periodically renewed during the life of the member 11.

In accordance with the present invention the bearing metal to be deposited on and bonded to the surface 12 is preformed or cast into a tubular billet 17 of cylindrical form having an external diameter slightly less than the internal diameter of the surface 12, a length roughly corresponding to the length of the surface 12, and a wall thickness corresponding to the desired thickness of the bearing layer to be bonded. The material may be of any of a variety of anti-friction metal linings used for present purposes such as babbitt, and other alloys containing lead, tin, copper, zinc, antimony, etc. For example, commonly used materials for which the present process is well adapted are 95% lead and 5% tin; 4% lead, 87% tin, 2% copper, 1% antimony; S. A. E. 10, 11, 12, 13 and 15 bearing materials.

In practising the process, surface 12 is first carefully cleaned, as by washing in a suitable solvent or detergent to render it chemically clean, and is thereafter tinned. Such tinning may be accomplished by heating the part to fusing temperature with an appropriate flux and tin thereafter applied. After tinning, the billet 17 is inserted within the interior of the member 11, the ends of the member enclosed, and the assembly spun at a relatively high speed, approximately 1,500 to 2,500 R. P. M., and heat applied to cause the melting and centrifugal deposit of the bearing metal onto the surface 12 as hereinabove described.

A suitable apparatus for carrying out the process is illustrated in the drawing and here includes a shaft or core 18 of heat conducting metal such as steel, upon which is carried opposed abutment means here in the form of a pair of retaining members 19 and 21 adapted to engage the ends 13 and 14 of the bearing member 11. As may be seen from Figure 2 of the drawing, the retaining members 19 and 21, the shaft 18 and the inner surface 12 of the bearing member cooperate to define an annular chamber 22 for receiving the tubular billet 17. Means is provided for urging the retaining members against the ends of the bearing member and for securing the assembly to the shaft for rotation therewith, and as here shown includes a peripheral shoulder 23 formed on the shaft medially the length thereof and a means for clamping the retaining members and associated bearing member 11 against the shoulder 23. The shoulder may be conveniently provided in a peripheral integral collar 24 formed on the shaft 18. The aforementioned clamping means, preferably, and as here shown, consists of a nut 26 threaded onto one end 27 of the shaft 18 extending from the shoulder 23 for engagement with and urging the retaining member 21 towards the shoulder 23. The opposite end 28 of the shaft here extends from the collar 24 for convenient chucking into a rotating drive means 29 generally depicted in phantom lines in Figure 1.

As an important feature of the present invention, means is provided for preventing adherence of the molten bearing metal to the retaining members 19 and 21 which, for purposes of strength and durability and ability to withstand and transmit heat, are preferably formed of iron, steel or equivalent material to which some adherence of molten bearing metal is likely to occur. As here shown, this means consists of nonmetallic plates 31 and 32 carried by the confronting faces 33 and 34 of the retaining members 19 and 21 in endwise engagement with the opposite ends 13 and 14 of the bearing member 11 so that the end closures for the member 11 will be in the form of the plates 31 and 32. For convenience in manufacture the faces 33 and 34 may be recessed so as to receive the plates 31 and 32 as inserts. I have found that the fashioning of the plates 31 and 32 in the form of precast carbon disks afford an excellent and especially suited construction for present purposes.

As another important feature of the process of the present invention, any impurities, oxides or gas pockets which should form in the molten metal are automatically displaced to portions of the lining which may later be removed from the bearing by machining or the like. Such impurities, etc., are lighter than the heavy bearing metal and tend to float on the interior surface of the molten metal due to the centrifugal force of rotation. In accordance with the present invention, the bonding surface 12 adjacent the retainer ends 13 and 14 is freed from impurities by allowing the molten metal to flow around the junctures of the surface 12 and retainer ends 13 and 14 and form a lip projecting beyond each of the bearing retainer ends. By reason of the slumping and melting action previously described, any oxides, etc., forming at the ends of the billet 17 will be carried into the lip for subsequent removal therewith. In carrying out this step of the process the exposed faces 36 and 37 of the inserts are recessed to provide annular pointed shoulders 38 and 39 at the outer peripheries of the disk for a ring-like engagement with the end faces 13 and 14 of the bearing member 11. These shoulders should substantially contact the opposite ends of the bearing member for purposes of sealing the bearing metal from any contact with the end members 19 and 21 while leaving mechanical support of the bearing member to the body portion of the end members. As here shown, these end members are formed with confronting recesses or sockets 41 and 42 for receiving and supporting the opposite ends of the bearing member 11 in coaxial relation to the shaft 18. With repeated use of the device, the knife edge shoulders 38 and 39 may wear away slightly, exposing a very narrow ring on the retainer members 19 and 21 to the molten bearing metal. In such case, the end faces may be machined to restore the co-planar relation of the carbon and steel.

During the heating of the assembly there will be a general expansion of the atmosphere within the enclosure as well as the generation of gas from any flux left from the tinning operation. Accordingly, appropriate venting means is provided for the enclosure and, as here shown, consists of a radial bore 43 in the shaft 18 which connects the chamber with an axial bore 44 in the shaft extending to the outer end 27 thereof.

In practising the process of the present invention, the bearing retainer member 11 is first cleaned and thoroughly tinned at its inner surface 12. The part is then mounted over the shaft 18 against the abutment member 19, it being noted that the diameter of the shaft is substantially less than the internal diameter of the surface 12 so as to permit the mounting, over the shaft and inside the surface 12, of the precast tubular billet 17 as above described. After insertion of the billet, the retainer member 21 is slid into place over the shaft end 27 and the nut 26 applied to rigidly clamp the bearing member 11 between the abutment members 19 and 21. The shaft end 28 may then be inserted into and grasped by a chuck 29 of any suitable machine for rotating the assembly at a relatively high speed. Preferably the rotation of the assembly is in a horizontal position of the shaft. When the assembly is brought up to desired speed of rotation, heat is applied to cause a melting of the billet 17. Preferably the assembly is heated from the exterior such as by playing the flame of a gas torch or burner 46 onto the exterior of the bearing member 11. Heat is then transmitted through and radiated from the assembly of the bearing member, the interconnected end members 19 and 21 and shaft 18 to the surfaces of the billet, and subsequently through the billet. As the exterior surface of the billet starts to melt there is an instantaneous centrifugal displacement of molten material onto the surface 12, it being noted that such molten material needs travel but a very short distance. Atmosphere and flux gas generated in the space between the billet and the surface 12 are rapidly displaced endwise of the surface and exit through the passages 43 and 44. As the billet continues to melt inwardly there is a further outward transfer of molten metal until all of the billet has been melted and centrifugally deposited, compacted and uniformly distributed upon the surface 12. After the bearing metal has been so melted and deposited, the flame or other supplied heat is discontinued, permitting the assembly to cool, while rotation is continued until after the bearing layer has solidified.

Thereafter the nut 26 may be backed off the shaft end 27 and the retainer member and completed bearing part removed in the reverse order of their assembly. It will be especially noted here that the function of the carbon inserts 31 and 32 in preventing or minimizing the adherence of molten bearing metal to the end retainer members 19 and 21 permits a quick and easy disassembly and eliminates mechanical destruction of the bond which would likely occur if the bearing metal had adhered to the members and had to be broken loose. The bearing part may be finished as desired, such as by reaming to desired diameter to fit the shaft part with which it will be used and by trimming all portions of bearing metal which will normally lap the opposite ends 13 and 14 by reason of the undercutting of the carbon inserts as illustrated. Such reaming and trimming will, at the same time, remove any impurities, etc., in the manner previously described. As a specific embodiment of the process, the following conditions may be observed for the parts, as noted.

Bearing retainer member:
    Material—steel
    I. D. of surface 12—approximately $\frac{11}{16}''$.
Billet:
    Material—95% lead; 5% tin
    O. D.—approximately $\frac{5}{8}''$
    I. D.—approximately $\frac{3}{8}''$
Shaft:
    Material—steel
    O. D.—approximately $\frac{5}{16}''$
Tinning operation:
    Surface 12 cleaned, heated, fluxed and tin applied.
Billet inserted, parts assembled and rotated at 1800 R. P. M.
Heat applied by flame of burner using natural gas as fuel with flame played over rotating assembly to heat assembly to approximately 650° F. to effect centrifugal casting.
Heat discontinued and rotation of assembly continued until temperature decreases to approximately 350° F.

It will now be apparent that the process of the present invention will afford a rapid, economic production of bearings of the type described which will be uniformly of high quality in providing a dense, fully compacted, clean, homogeneous bearing lining which is firmly bonded to the retainer member and is substantially completely free from slag, oxide particles and gas bubbles and in which the completed bearings are of precise and predetermined form, thereby minimizing required machining preparatory to use.

I claim:
1. The process of manufacturing a sleeve type bearing by bonding a layer of bearing metal to the internal cylindrical surface of a bearing member having opposite ends defining the longitudinal ends of said surface, which consists in inserting a tubular billet of bearing metal into said bearing member with the external periphery of said billet substantially coextensive with and in close juxtaposition to said internal surface, closing off the opposite ends of said bearing member to provide an enclosed chamber for said billet, rotating the above defined assembly about the axis of said surface, applying heat to said assembly during said rotation to heat the exterior of the billet by radiation and conduction, simultaneously applying heat to the interior of the billet by radiation, this heating softening said billet and causing centrifugal slumping thereof onto said surface and bonding thereto; thereafter discontinuing said application of heat, and continuing said rotation until said bearing metal has solidified.

2. The process of manufacturing a sleeve type bearing by bonding a layer of bearing metal to the internal surface of a bearing member having opposite ends defining the longitudinal ends of said surface, which consists in inserting a tubular billet of bearing metal into said bearing member with the external periphery of said billet substantially co-extensive with and in close juxtaposition to said internal surface, supporting said bearing member between separable metallic end members engaged with said opposite ends so as to define an enclosed chamber for said billet, rotating the above defined assembly about the axis of said surface, applying heat to said assembly during said rotation to heat the exterior of the billet by radiation and conduction, simultaneously applying heat to the interior of the billet by radiation, this heating softening said billet and causing centrifugal slumping thereof onto said surface and bonding thereto, thereafter discontinuing said application of heat, and continuing said rotation until said bearing metal has solidified.

BENJAMIN H. HADLEY.

References Cited in the file of this patent

UNITED STATES PATENTS

| Number | Name | Date |
| --- | --- | --- |
| 422,590 | Haskins | Mar. 4, 1890 |
| 914,459 | Schwaninger | Mar. 9, 1909 |
| 1,630,043 | Wetmore | May 24, 1927 |
| 1,923,075 | Brown | Aug. 22, 1933 |
| 1,993,774 | De Bats | Mar. 12, 1935 |
| 2,222,525 | Zink | Nov. 19, 1940 |
| 2,262,983 | Woods | Nov. 18, 1941 |

FOREIGN PATENTS

| Number | Country | Date |
| --- | --- | --- |
| 401,533 | Great Britain | Nov. 16, 1933 |